Figure 1:
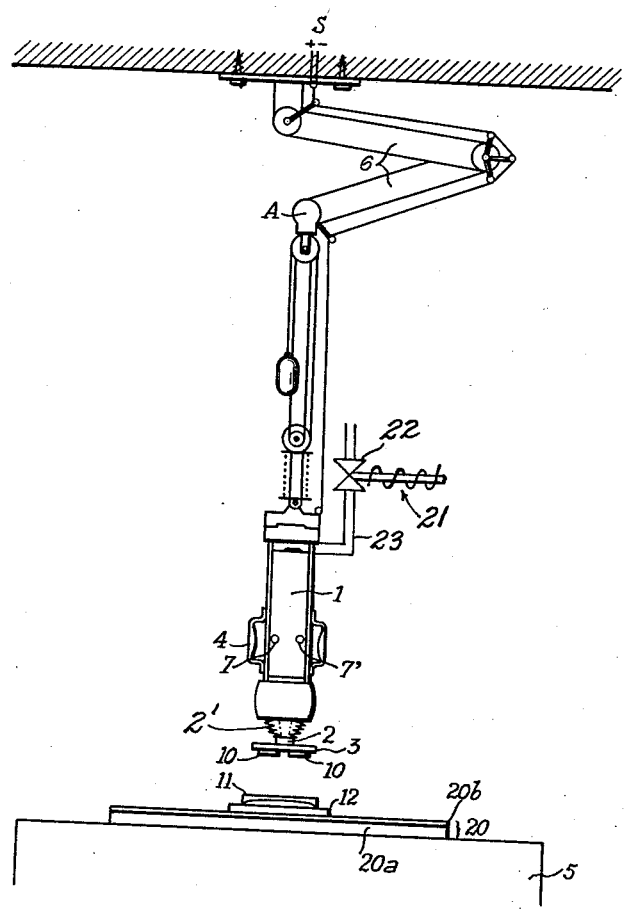

July 2, 1963 H. LINDEROTH 3,095,803
CUTTING PRESSES AND CUTTING SURFACES THEREFOR
Filed Feb. 5, 1959 3 Sheets-Sheet 1

INVENTOR
HANS LINDEROTH
BY Irwin S. Thompson
ATTY.

July 2, 1963 H. LINDEROTH 3,095,803
CUTTING PRESSES AND CUTTING SURFACES THEREFOR
Filed Feb. 5, 1959 3 Sheets-Sheet 2
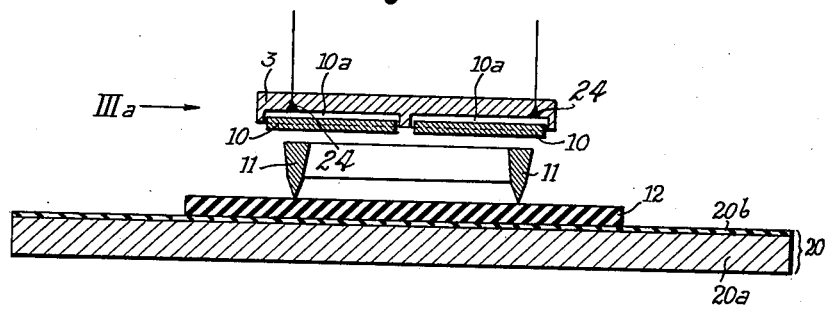
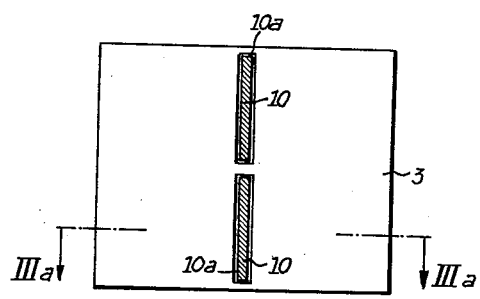
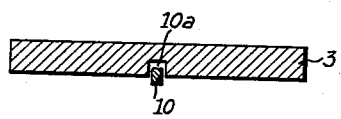
INVENTOR
HANS LINDEROTH July 2, 1963  H. LINDEROTH  3,095,803
CUTTING PRESSES AND CUTTING SURFACES THEREFOR
Filed Feb. 5, 1959  3 Sheets-Sheet 3

Hans Linderoth
INVENTOR

ATTORNEY

United States Patent Office 3,095,803
Patented July 2, 1963

3,095,803
CUTTING PRESSES AND CUTTING SURFACES
THEREFOR
Hans Linderoth, 16 Avenue Vion Whitcomb,
Paris, France
Filed Feb. 5, 1959, Ser. No. 791,369
Claims priority, application France Feb. 12, 1958
10 Claims. (Cl. 100—50)

The invention relates to presses or the like machines especially for use in cutting, stamping, embossing or otherwise operating on sheet material, such, for example, as leather, rubber, paper, textile or synthetic material by actuating clicking knives, cut-out dies, embossing dies or other tools.

At present stamping, cut-out, embossing, and similar operations are performed by mechanical, hydraulic or pneumatic presses, equipped with horizontally movable beams. Such presses have the following disadvantages in common:

They require careful presetting and adjustment, so that the stroke of the beam of the press has exactly the length or strength required in each case. If, for instance in a cutting operation, the beam does not force the die far enough through the material worked on, the part to be cut out is not separated from the rest of the material, and if the beam forces it too far the clicking knife or cut-out die penetrates into and gets stuck in the stamping pad. These presses therefore require resetting not only for different heights of dies but also for different circumferences of dies and for different materials worked upon. Often the sequence of work is such that very frequent adjustments are necessary.

Their heavy swinging beams are brought in over the tool and work piece from the side. This is a time and effort consuming motion because of the acceleration and retardation factors involved.

They are apt to break the tools used and to destroy the material worked upon, when, as frequently happens, the operator, in order to save time, releases the downward stroke before the swinging beam has come to rest, which makes it hit the tool and work piece at a sharp angle. Unnecessarily heavy and expensive tools are often used to offset the risk of damage to the tools.

They are heavy and clumsy to move and require solid foundations.

According to the present invention I provide in a press or the like machine, especially for use in cutting, stamping, embossing or otherwise operating on sheet material by actuating clicking knives, dies or other tools and comprising a piston adapted to actuate the tool; an electrical control system adapted to control operation of the piston, a plate on said piston mounting electrical switch means or contacts forming part of said system and adapted to be closed by contact with the tool so as to effect or enable operation of said control system.

Further, according to the present invention I provide in or for a press or the like machine, especially for use in cutting, stamping, embossing or otherwise operating on sheet material by actuating clicking knives, dies or other tools; a stamping pad comprising a base of relatively hard material having a top layer of relatively soft material.

Still further, according to the present invention I provide in a press or the like machine, especially for use in cutting, stamping, embossing or otherwise operating on sheet material by actuating clicking knives, dies or other tools; a working table and a stamping pad resiliently mounted thereon.

Figure 4:
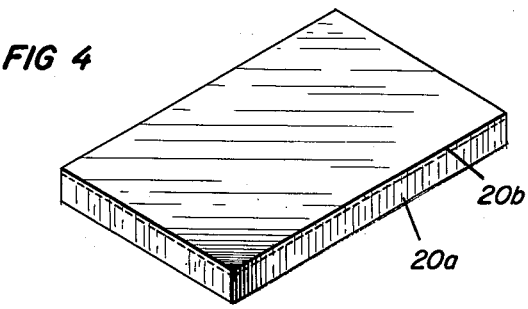
Figure 5:
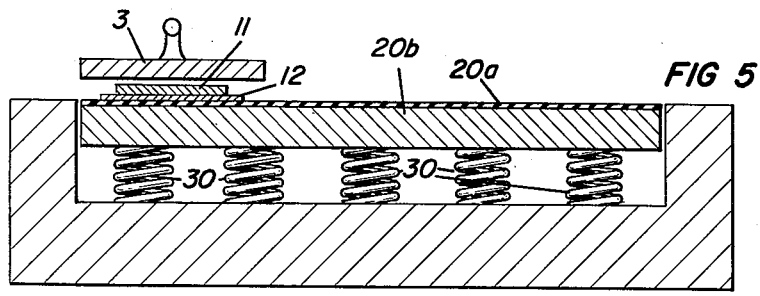
Figure 6:
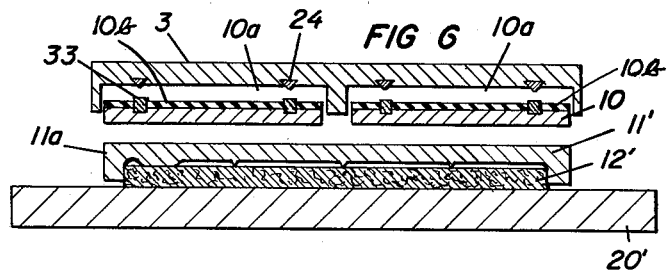
Figure 6A:
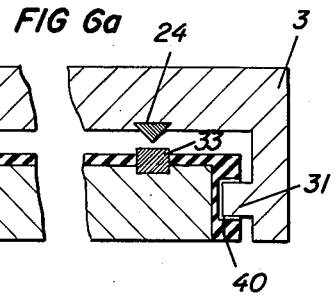

Embodiments of the invention will now be described, by way of example, with reference to the accompanying drawings, in which:

FIG. 1 is a side view of a press according to the invention,

FIG. 2 shows a section through a stamping pad and adjacent parts for a cutting operation, FIG. 3 shows a view of the under side of the plate attached to the piston, FIG. 3a is a section on the line IIIa—IIIa of FIG. 3, FIG. 4 shows the stamping pad, FIG. 5 shows a section through the stamping pad with one possible system of support, FIG. 6 shows a section through the stamping pad and adjacent parts for an embossing operation, and FIG. 6a is an enlarged broken sectional view of the plate in FIG. 6.

Referring to the drawings, the press shown in FIG. 1 is operated by compressed air. It is composed of an air cylinder 1 and a piston 2 which is attached to a plate 3 of steel or other suitable material which may be covered with aluminum or other suitable material when double edged cutting knives are used. A sleeve 2' made of resilient material is connected between the lower end of piston 2 and cylinder 1 to prevent foreign matter from entering the cylinder. The plate 3 moves with the piston 2, which in turn makes relatively short and rapid hammer strokes which may be regulated by suitable control of the flow of compressed air. The piston 2 normally returns automatically to its starting position. The recoil of the piston assembly may be governed by the weight of the assembly. The piston assembly is fitted with handles 4 for easy manipulations horizontally as well as vertically. It is of course also possible to attach embossing, cutting or piercing tools 11 directly to the plate 3 by various means.

The compressed air cylinder and piston assembly is suspended from a point above its centre of gravity so that it always assumes a vertical position, making the plane of the stamping plate 3 always horizontal.

It is attached to a support which allows free movements of it in the horizontal plane over the whole working table 5 as well as vertically.

This may be done in many ways. For example, it may, as shown, be hung from a ceiling on an articulated arm 6, allowing for movements in the horizontal field, and allowing for vertical movements by means of a line, pulleys and counterweight mechanism.

The press may be actuated either mechanically and manually, for example, by two-handed control buttons 7 and 7' on the air cylinder or electrically and automatically. The latter system is preferable as it is safer and quicker than the former.

When the electrical and automatic system is used, two long or several short metal staves 10 are inserted in electrically insulated horizontal grooves 10a radiating from the centre of the bottom face of the plate and in the example only two grooves are shown. The metal staves 10 are so arranged that insulation material 10b surrounds the sides, ends and top thereof. The ends of insulation material 10b have channels 40. One channel 40 engages projection 31 within grooves 10a while the other channel 40 is engaged by locking screws 32 threadedly disposed through plate 3 into grooves 10a so that staves 10 hang down somewhat along their whole length under the bottom face of the plate 3 and so that if subjected to upward pressure they will be pushed into the grooves 10a completely. Contact pins 33 integral with staves 10 project through insulating material 10b. When in this position contact pins 33 engage contacts 24 in an electric circuit of which they form part, thereby actuating a solenoid 21 which in turn operates a valve 22 controlling the flow of compressed air along a pipe 23 into the cylinder.

The solenoid 21 will not be actuated unless electric low voltage current passes through both of the staves 10 when they are in their upward position. This condition is fulfilled when the plate 3 is in contact with a metal die 11 which is centrally located under it.

It will be seen that by this arrangement (1) The press cannot be actuated when the metal staves 10 are not connected by an electric conductor, (2) The press cannot be actuated except when the plate 3 is in a horizontal position if the electrical contact is established by a clicking knife, die or other tool 11 employed on the stamping pad 20, (3) It is possible to adjust the mechanism so that the press is actuated, (a) Only when there is a contact between the plate itself 3 and the clicking knife, die or other tool employed 11, (4) The stroke of the press is released automatically at the right moment, which gives control of the operation and saves time, (5) The press cannot be actuated if there are non-conducting obstructions, for example, hands, in the way since the staves 10 are not connected by an electrical conductor.

If an operator's hand is inadvertently interposed between the plate 3 and tool 11, the current employed to operate the electrical circuit is not strong enough to pass through a human hand and still suffice to energize the press. Moreover, staves 10 are so arranged in plate 3 in order to prevent an operator's hand from accidentally being in contact with both of staves 10 at the same time.

The chief disadvantage of the stamping pads presently used is that, by too hard a stroke of the press, the clicking knives, dies, or other tools are forced too deeply into the pad and get stuck there. This difficulty may be overcome if the stamping pad 20a is made of a base of hard material, softer than that used for the clicking knives or cut-out dies, covered with a thin layer 20b of softer material, for example, a combination of an aluminium base and rubber compound top. The top layer 20b allows the knife or die 11 to cut through the material 12 cleanly and the hard material in the base prevents the knife or die from penetrating so deeply as to get stuck.

The combination of the hard and soft material in the stamping pad may be made in many different ways. The soft material may be placed on the hard base in sheet form, it may be glued, burned or baked to the base, or it may simply be painted on. In the latter case, the maintenance of the stamping pad in good operating condition is reduced to the very simple operation of repainting the pad whenever it gets worn. There are no exacting requirements for the uniform thickness of the soft layer.

For embossing and similar operations, the arrangement shown in FIG. 6 may be used. In this case the stamping pad 20' has no soft top layer. The embossing die 11' is simply placed on the work piece 12. The depth of imprint is governed by the height of flanges 11a on the embossing die in that its motion stops when they come to rest on the stamping pad 20'.

A system of this kind must allow for the residual energy in the stroke of the press to be absorbed in some way so that the tools are not destroyed. If a pneumatic press is used this energy is simply taken up in the recoil of the press. In presses having a predetermined length of stroke, the stamping pad or table may be mounted on springs 30, FIG. 5, which take up the energy remaining when the knife or die has cut through to the hard, unyielding material.

The use of a pneumatic press with a freely suspended piston assembly and the use of a relatively light stamping pad allows great freedom in the construction of a practical work table and in the lay-out of an efficient work place.

It is possible, for instance, to place the operator on a chair with the material to be worked on and the tools to be used conveniently located beside him, and to mount the work table, the whole top of which could be a stamping pad, so that it may be freely rotated in front of the operator. In this way, the handling of the material worked on may be minimised and the operator may inspect and reach any part of it quickly and easily.

The energy applied is slightly larger than that needed for the work to be carried out and the length of the stroke is controlled and the residual energy is absorbed as follows:

(a) For embossing operations: the length of the stroke is limited by the size and form of the tool used;

(b) For cutting and piercing operations: the length of the size and stroke is limited by the structure of the stamping pad;

(c) For all types of operations: the excess energy is absorbed either by recoil of the piston assembly or by a system of springs supporting the stamping pad.

As a result of the invention a press is provided having the following advantages:

(a) It may be used with dies of different heights without adjustment.

(b) It may be adjusted to suit different types of work. Such adjustments, however, are required within wide limits and therefore only with radical changes in the material worked on.

(c) It is impossible for a tool to get stuck in the stamping pad.

(d) The risk of releasing a stroke at other than at right angles to the die and work piece is eliminated. Light and relatively inexpensive tools may therefore be used and damage to the workpiece avoided.

(e) Release of the stroke may be effected automatically, which saves time.

(f) Positioning of the head is swift and easy.

(g) The press cannot function when there is a non-conducting obstacle between the die and the plate which eliminates the danger of the operator's hands being caught in the press.

(h) It allows more convenient handling of the work piece and saves handling time.

I claim:

1. A press for operating on sheet material, the press comprising a tool for effecting an operation on the sheet material, a piston-and-cylinder assembly for applying pressure to the tool, means carrying said piston-and-cylinder assembly so that same is vertically movable, an electrical control system for initiating operation of the piston-and-cylinder assembly, a plate on the piston, electrical contacts mounted on said plate and forming part of the control system and adapted to be closed on contact with the tool to operate the control system and thereby actuate the piston-and-cylinder assembly and supporting means for supporting the sheet material.

2. A press for operating on sheet material, the press comprising a stamping pad for supporting the sheet material and including a base of relatively hard material and a top layer of relatively soft material, a tool disposed on the sheet material for effecting an operation thereon, a piston-and-cylinder assembly for applying pressure to the tool, means carrying said piston-and-cylinder assembly so that same is vertically movable, an electrical control system for effecting operation of the piston-and-cylinder assembly, and a plate on the piston, electrical contacts mounted on said plate and forming part of the control system and adapted to be closed on contact with the tool to operate the control system and thereby actuate the piston-and-cylinder assembly.

3. A press according to claim 2, in which said hard material is aluminum and said soft material is a rubber compound.

4. A press for operating on sheet material, the press comprising a working table, a stamping pad mounted on the working table for supporting the sheet material and including a base of relatively hard material and a top layer of relatively soft material, resilient means between the working table and the stamping pad, a tool disposed on the sheet material for effecting an operation thereon, a piston-and-cylinder assembly for applying pressure to the tool, means carrying said piston-and-cylinder assembly so that same is vertically movable, an electrical control system for effecting operation of the piston-and-cylinder assembly, and a plate on the piston, electrical contacts mounted on said plate and forming part of the control system and adapted to be closed on contact with the tool to operate the control system and thereby actuate the piston-and-cylinder assembly.

5. A press for operating on sheet material, the press comprising a working table, a stamping pad mounted on the working table for supporting the sheet material and including a base of relatively hard material and a top layer of relatively soft material, resilient means between the working table and the stamping pad, a tool disposed on the sheet material for effecting an operation thereon, a piston-and-cylinder assembly for applying pressure to the tool, means carrying said piston-and-cylinder assembly so that same is vertically movable, an electrical control system for effecting operation of the piston and cylinder assembly, and a plate on the piston, electrical contacts mounted on said plate and forming part of the control system and adapted to be closed on contact with the tool to operate the control system and thereby actuate the piston-and-cylinder assembly, the piston-and-cylinder assembly being freely suspended from a support so that said plate remains horizontal.

6. A press for operating on sheet material, the press comprising a stamping pad for supporting the sheet material and including a base of relatively hard material and a top of relatively soft material, a tool for effecting an operation on the sheet material, a piston-and-cylinder assembly for applying pressure to the tool, means carrying said piston-and-cylinder assembly so that same is vertically movable, an electrical control system for effecting operation of the piston-and-cylinder assembly, a plate on the piston formed on its underside with a plurality of electrically insulated horizontal grooves, and a vertically-movable contact element disposed in each groove and projecting downwardly beyond the underside of the plate, the contact elements forming part of the control system and being adapted to be moved vertically upwards on contact with the tool to close the control system and thereby operate the piston-and-cylinder assembly.

7. A press for operating on sheet material, the press comprising a working table, a stamping pad mounted on the working table for supporting the sheet material and including a base of relatively hard material and a top layer of relatively soft material, resilient means between the working table and the stamping pad, a tool disposed on the sheet material for effecting an operation thereon, a piston-and-cylinder assembly for applying pressure to the tool, means carrying said piston-and-cylinder assembly so that same is vertically movable, an electrical control system for effecting operation of the piston-and-cylinder assembly, a plate on the piston formed on its underside with a plurality of electrically insulated horizontal grooves, and a vertically-movable contact element disposed in each groove and projecting downwardly beyond the underside of the plate, the contact elements forming part of the control system and being adapted to be moved vertically upwards on contact with the tool to close the control system and thereby operate the piston-and-cylinder assembly.

8. A press according to claim 7, in which the tool is an embossed die having flanges for limiting movement of the die by engagement with the stamping pad.

9. A press according to claim 7, in which the control system is closed via the tool.

10. A press for operating on sheet material, the press comprising a tool for effecting an operation on the sheet material, a plate, means carrying the plate above the tool and vertically movable to contact the plate with the tool, power means for moving the plate further downwards to apply operative pressure in the tool, supporting means to support the sheet material and a control mechanism mounted on the plate and comprising a plurality of movable control elements and positioned to engage the tool and which are moved simultaneously on contact with the tool to effect operation of the press and apply pressure to the tool.

References Cited in the file of this patent

UNITED STATES PATENTS

| | | |
|---|---|---|
| Re. 17,085 | Thomas | Sept. 18, 1928 |
| 1,485,886 | Russell | Mar. 4, 1924 |
| 2,375,707 | Speller | May 8, 1945 |
| 2,693,752 | Garapolo | Nov. 9, 1954 |
| 2,783,838 | Ericson et al. | Mar. 5, 1957 |
| 2,792,883 | Pokorski | May 21, 1957 |

FOREIGN PATENTS

| | | |
|---|---|---|
| 316,897 | Switzerland | Dec. 15, 1956 |